United States Patent
Brown et al.

[11] Patent Number: 6,057,913
[45] Date of Patent: May 2, 2000

[54] COMPACT SHEARING WAVEFRONT SENSOR AND METHOD

[75] Inventors: Dan Brown, Madison; Rodney L. Clark, Gurley; Randall Lindsey, Huntsville, all of Ala.

[73] Assignee: Mems Optical Inc., Huntsville, Ala.

[21] Appl. No.: 09/018,341

[22] Filed: Feb. 4, 1998

Related U.S. Application Data

[60] Provisional application No. 60/036,894, Feb. 5, 1997.

[51] Int. Cl.$^7$ .......................................................... G01J 1/20
[52] U.S. Cl. ............................ 356/121; 356/354; 250/201
[58] Field of Search ...................................... 356/121, 354; 250/201

*Primary Examiner*—Robert H. Kim
*Assistant Examiner*—Andrew H. Lee

[57] ABSTRACT

A compact wavefront sensor includes an array of microlenses supported above a microchip. The microchip includes an array of gratings and photodetectors, which correspond to a particular microlens. Light incident on a grating will be diffracted back towards the array of microlenses, where it is focussed onto a corresponding photodetector. The photodetector receives light from gratings adjacent thereto, and detects a resulting interference therebetween. The detected interference is then used to reconstruct the wavefront. The detected interference can also be used to correct wavefronts by controlling a modulating element reflecting the wavefront.

21 Claims, 3 Drawing Sheets

COMPACT SHEARING WAVEFRONT SENSOR AND METHOD

CROSS-REFERENCE TO RELATED APPLICATIONS

This application claims the benefit of priority under 35 U.S.C. §119(e) to U.S. Provisional Application Ser. No. 60/036,894 filed Feb. 5, 1997, which is hereby incorporated by reference in its entirety.

GOVERNMENT RIGHTS

The U.S. Government has rights in the present application under Contract F29601-96-C-0052.

BACKGROUND OF THE INVENTION

1. Field of the Invention

The present invention is directed to providing a compact sensor for measuring wavefront phase, particularly a compact sensor which is compatible with micro-electro-mechanical systems.

2. Description of Related Art

The most common wavefront sensors measure wavefront slope. Such sensors include Hartmann and Shearing sensors. A Shearing interferometer displaces an incoming wavefront laterally by a small amount and analyzes the interference pattern between the original and the displaced wavefront. The resulting interference pattern relays information regarding any distortions in the incoming wavefront. There are many physical arrangements for obtaining lateral shear, but none have yet been developed on a small scale. This is due primarily to the requirement of the two beams for interference.

A Hartmann sensor breaks the aperture into an array of subapertures. Each subaperture has a lenslet to focus the light onto a subarray of detectors. Tilts in the subaperture wavefronts are detected by the centroid motion of the focal spot on the subarray of detectors. The Hartmann sensor can be used to create a wavefront camera. However, the Hartmann sensor requires the computation of subarray centroids. This computation is difficult to perform on a chip. The Hartmann sensor subarrays also require pixel non-uniformity gain and offset correction for low noise wavefront slope measurement.

The Hartmann sensor is based on the premise that a wavefront can be sampled in a number of locations across the wavefront in a predetermined fashion. The wavefront can then be reconstructed by relating the sample points to each other. The Hartmann sensor does not require two beams, since it is a screen test, not an interferometer. Thus, the Hartmann sensor is based purely on geometrical optics. As noted above, the Hartmann sensor is computationally inelegant and has limited application.

SUMMARY OF THE INVENTION

It is an object of the present invention to provide a wavefront sensor that can be integrated on a microchip device.

It is further an object of the present invention to provide a compact shearing interferometer.

It is another object of the present invention to provide wavefront correction in accordance with a sensed wavefront.

These and other objects of the present invention can be realized by a wavefront sensor including a microchip containing gratings and photodetectors arranged in an array and an array of microlenses supported over the microchip, each microlens of the array corresponding to a grating on the microchip, the grating receiving light from corresponding microlens.

The gratings may be reflective gratings which reflect light received from a corresponding microlens back to the array of microlenses. Then the array of microlenses further includes, on a side opposite to the microchip, focussing elements arranged in an array. The focussing element may direct light diffracted by the gratings onto a corresponding photodetector. Alternatively, each photodetector receives light from gratings adjacent thereto on the microchip.

The photodetector may output signals to a deformable mirror. An amount of shearing introduced to beam interfering on the photodetectors may be equal to a pitch of the microlens array. The gratings may be chirped gratings.

An adaptive optical system in accordance with the present invention may be realized by providing an array of reflective modulator elements, a microchip containing gratings and photodetectors arranged in an array, and an array of microlenses supported over the microchip. Each microlens of the array corresponds to a grating on the microchip. The grating receives light from a corresponding microlens. The photodetectors receive light diffracted from adjacent gratings. A modulator element is controlled in accordance with an output of a corresponding photodetector. The photodetectors, the gratings, and the modulator elements may be integrated on a same side of the microchip, or the modulator elements may be integrated on an opposite side of the microchip of the photodetectors and the gratings. Another array of microlenses above said array of modulator elements.

A method for sensing a wavefront in accordance with the present invention may be realized by arranging gratings and photodetectors in an array on a microchip, supporting an array of microlenses over the microchip, each microlens of said array corresponding to a grating on said microchip, the grating receiving light from a corresponding microlens and diffracting received light into opposite orders, and directing light diffracted by two of said gratings onto a corresponding photodetector, in order to sense the wavefront.

The directing may include reflecting light received by the gratings from a corresponding microlens back to the array of microlenses, and focussing reflected light onto a corresponding photodetector. The focussing may include focussing light diffracted from adjacent gratings onto a corresponding photodetector.

The directing may include directing light from gratings adjacent to each photodetector onto that photodetector. The sensed wavefront may be output to a deformable mirror.

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1A:
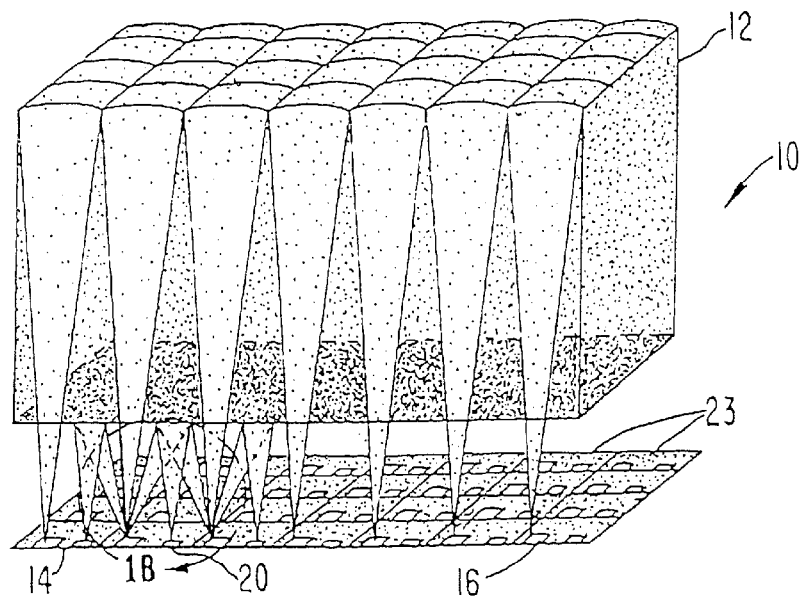
FIGS. 1A and 1B are perspective views of a wavefront sensor of the present invention.
Figure 1B:
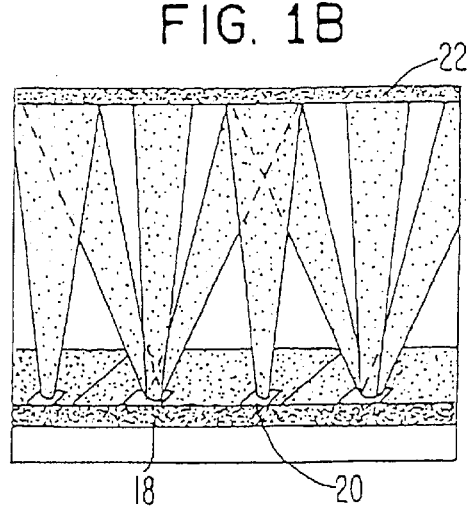

As shown in FIG. 1, the wavefront sensor 10 of the present invention includes an array of microlenses 12 supported over a microchip 14. The microchip includes gratings 18 and photodetectors 20. The array of microlenses 12 also includes a focussing grating 22 etched on a bottom thereof, facing the microchip 14. A micro-circuit 23 fabricated on the same substrate uses the detected wavefront shear to reconstruct the analog wavefront. There will be a micro-circuit 23 associated with each photodetector 20.

Light for each pixel is input through a microlens of the array of microlenses 12. The microlenses are preferably diffractive. Typically a diffractive lenslet array will have a thickness of 2 mm, but this may be modified in accordance with a desired application.

The light is directed onto a surface reflective grating 18. The grating 18 splits the input light into two diffractive orders of opposite signs. These orders diverge until reaching the focussing grating 22. The focussing grating 22 reflects and focusses light onto a photodetector 20. Each photodetector 20 receives light from adjacent pixels, i.e. a pixel to the left and right of the photodetector 20. The light from the adjacent pixels thus interferes on the photodetector 20. The photodetector 20 includes a circuit to adjust its gain and offset. The gain and offset adjustment of the photodetector 20 may be included in the micro-circuit 23.

Thus, the configuration shown in FIG. 1 provides a shearing interferometer on a pixel basis. The sensor 10 is divided into a large number of apertures corresponding to the microlenses, and each aperture contains its own shearing system. The offset in the individual shearing system is provided by the pitch of the microlenses in the array.

The compact interferometer wavefront sensor of the present invention may be advantageously employed as a wavefront corrector. In such a configuration, the gratings 18 include a metallic mirror portion 16 that reflects light back to the zeroth or central order that would be modulated with the modulator element. Most of the beam is reflected into the central order.

The light reflected into the central order is modulated in accordance with a modulator element in response to the interference detected by a corresponding photodetector 20, so that the output light is corrected. The micro-mirror 16 includes a modulator element 24 controlled by the output of the photodetector 20.

Figure 2A:
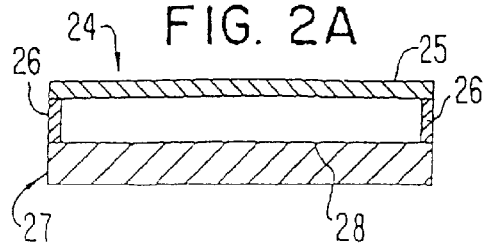
FIG. 2A is a side view of a modulatable mirror in the undeflected position.
Figure 2B:
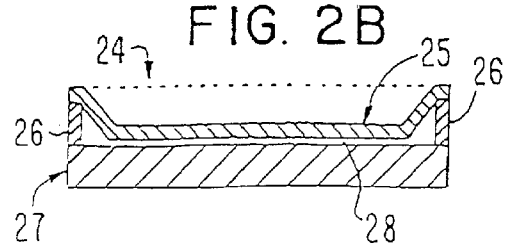
FIG. 2B is a side view of the modulatable mirror shown in FIG. 2A in a deflected position.

FIGS. 2A and 2B illustrate a single modulator element 24 for spatial light modulating of the present invention. Modulator elements of this type generally are disclosed in U.S. Pat. No. 5,691,836 to Clark, entitled "Optically Addressed Spatial Light Modulator and Method" the entire contents of which are hereby incorporated by reference.

The micro-circuit 23 converts a charge output by the photodetector 20, which converts the light to electrons, into a voltage, amplifies the voltage and drives the modulator element 24. The gain and offset adjustment of the photodetector 20 may be included in the micro-circuit 23. The micro-circuit 23 is typically powered by an external voltage between ±15 volts.

The modulator element 24 consists of a metallic mirror surface 25 mounted above the substrate 27 by mounting units 26 located on either end of the metallic mirror 25. The gratings 18 are located on the metallic mirror surface 25. This metallic mirror 25 provides the zeroth order reflection of the primary beam. The mounting units 26 are preferably made of the same material as that of the metallic mirror 25. The modulator element 24 also includes a flat conductive plate 28 positioned on the substrate 18 under the metallic mirror 25.

The micro-lens 12 needs to form the focus spot on the metallic mirror 25 which is not significantly degraded by defocussing over the range of travel of the metallic mirror 25 through the distance above the substrate 27. In other words, the 0 focus spot size must be no greater than the width of the metallic mirror 25 over the range of travel of the metallic mirror 25, i.e., there is sufficient depth of focus. A greater spot degradation can be tolerated for the diffracted beams on the photodetector 20.

After the photodetector 20 has received the diffracted beams, the micro-circuit 23 converts the charge output by the photodetector 20 into a voltage, amplifies this voltage, and injects the charge under the modulator element 24. The flat conductive plate 28 located underneath the metallic mirror 25 receives the charge output from the micro-circuit 23 in order to deflect the metallic mirror 25 in response to the charge injected by the micro-circuit 23. The signal output from each photodetector 20 is a function of the transfer characteristics of the pixel micro-circuitry 16. The output voltage range will be designed to optimize the deflecting ribbon and/or modulating medium 25. For example, the deflection may be calculated as follows:

$$\text{Deflection} = \text{Gain} * R * K * P * S$$

where

Gain—circuit gain (typical—100)

R—load resistance (typical 1000 ohms)

K—SLM deflection constant (typical—100 nm/Volt)

P—optical power (typical—5 $\mu$Watts)

S—photodiode response (typical—0.3 amps/Watt)

In designing the deflection range, all of these values are variables to the designer so that an optical configuration is achieved.

An example of such a deflection due to the electrostatic force induced by the injected charge from the micro-circuit 23 can be seen in FIGS. 2A and 2B. In FIG. 2A, no charge is applied to the conductive plate and the metallic mirror 25 remains level supported by its mounting units 26. In FIG. 2B, the charge has been applied to the conductive plate 28 by the micro-circuit 23 in response to the sensing of the diffracted beams by the photodetector 20, and the metallic mirror 25 is attracted to the conductive plate 28.

In such a micro-mechanical modulation scheme, the only limiting factors of the operational frequency of the dimensions and thickness of the metal mirror 25. These operational frequencies for arrays of metallic strips are in excess of 1 megahertz. The dynamic range is represented by the deflection range between the undeflected position of the metallic mirror 25, shown in FIG. 2A, and the substrate 27, and may be selected to be one-half of a wavelength of interest such that upon reflection at the furthest deflection of the metallic mirror 25, a full 2π radian, or one complete cycle, phase shift upon reflection may be achieved. For visible light, this would result in the metallic mirror being mounted 300 nanometers above the substrate 18. Alternatively, the metallic mirror may be situated some other desired multiple of a fraction of the wavelength, e.g., mλ/4, where m is an integer. upon deflection or repulsion of the metallic mirror 25 by the conductive plate 28, a beam having a corrected wavefront is output from the device.

There are numerous alternatives as to the type of microlenses 12 and the type of material used for the metallic mirror 25 depending upon the type of modulation and the type of application desired. Advantageously, the metallic mirror 25 may be made of the same material as that of transistor gates of the micro-circuit 16. For example, the metallic mirror 25 may be made out of either poly silicon or a poly silicon/silicon nitride sandwich with a layer of metal deposited on top. The conductive flat plate 28 under the metallic mirror 25 is also advantageously made of poly silicon.

Figure 3A:
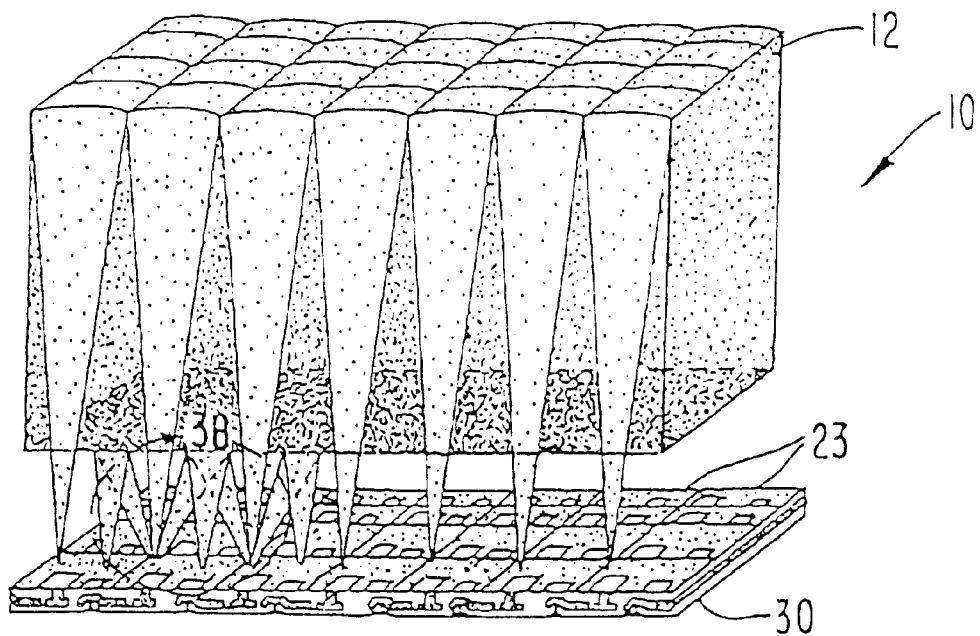
FIGS. 3A and 3B are perspective views of a wavefront sensor in accordance with the present invention back-to-back with a spatial light modulator.
Figure 3B:
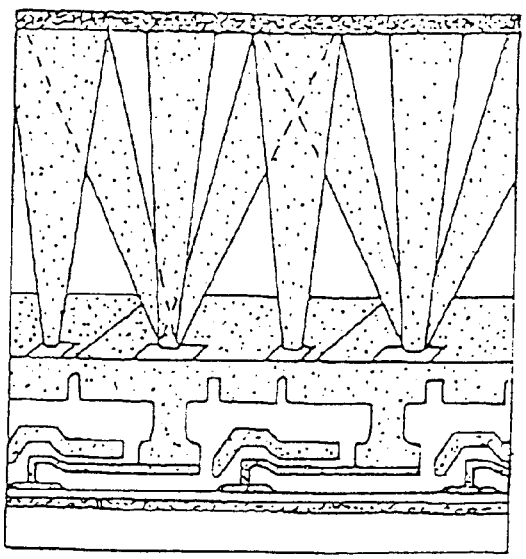

Alternatively, a deformable mirror array may be placed back to back with the wavefront sensor, as shown in FIG. 3. In this configuration, the incoming wavefront is split between an array 30 of modulating elements and the wavefront sensor 10, with most of the power being directed to the array of modulating elements. The array of modulating elements includes a continuous membrane deformable mirror 32. The wavefront sensor 10 is still used to drive the modulating elements, with the corrected wavefront being output therefrom. The micromirror portion 16 would not necessarily be needed in the wavefront sensor 10, since the sensor 10 is being used purely as a wavefront measuring device. Thus, just the gratings 18 which provide the diffraction are needed. Ultimately, all of these components may be integrated into a single device chip.

Figure 4:
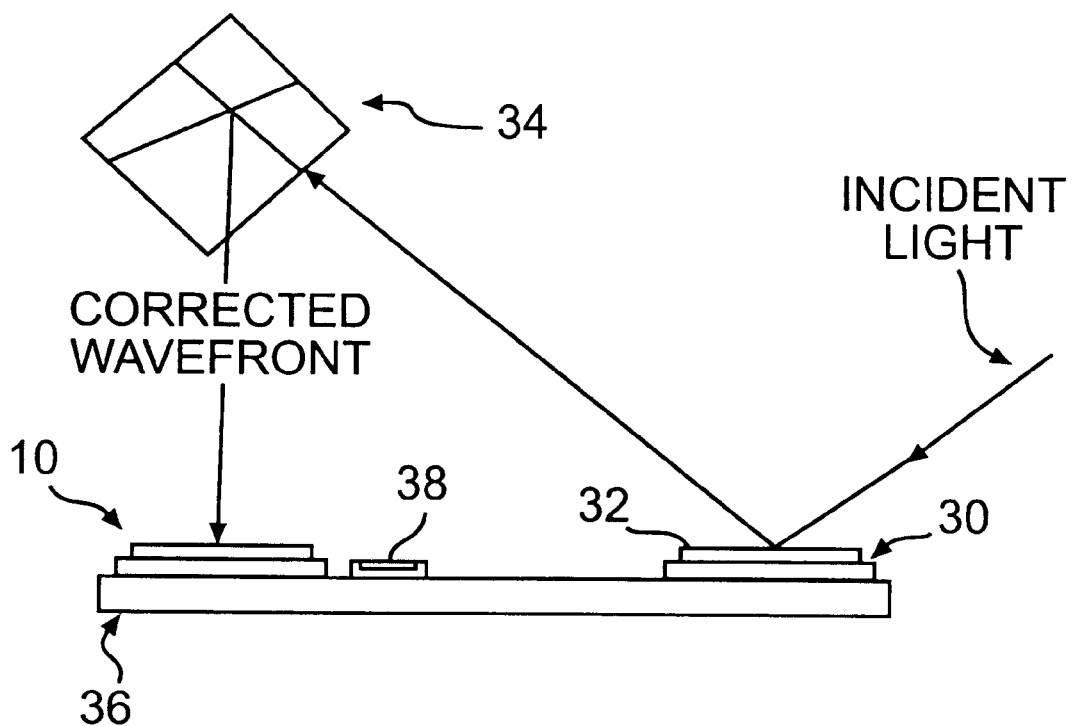
FIG. 4 is a schematic side view of a wavefront sensor in ac accordance with the present invention mounted on a same substrate as a micromirror.

A further configuration is shown in FIG. 4, in which the wavefront sensor and the micro-mirror are not directly integral with one another, but are mounted on a common substrate. In FIG. 4, the array of modulating elements 30 including a continuous membrane deformable mirror 32 is mounted on a circuit board 36. The wavefront sensor 10 is also mounted on the circuit board 36 separate from the micro-mirror 32. Drive electronics 38 connecting the array 30 and the wavefront sensor 10 are also mounted on the circuit board 36.

Incident light is reflected by the deformable mirror 32 and directed to an optical beam splitter 34. The optical beam splitter 34 directs some of the light to the wavefront sensor, and the rest of the light to an intended use. The wavefront sensor 10 operates in the manner discussed above. The drive electronics 38 then delivers the drive signal from the wavefront sensor 10 to the array of modulating elements 30 such that light reflected by the deformable mirror 32 is corrected.

The invention being thus described, it will be obvious that the same may be varied in many ways. For example, when using white light, or non-monochromatic light, the gratings are preferably chirped. Further, either the continuous deformable mirror or an array of deformable mirrors may be used. Such variations are not to be regarded as a departure from the spirit and scope of the invention, and all such modifications as would be obvious to one skilled in the art are intended to be included within the scope of the following claims.

What is claimed is:

1. A wavefront sensor comprising:
   a microchip containing gratings and photodetectors arranged in an array; and
   an array of microlenses supported over said microchip, each microlens of said array corresponding to a grating on said microchip, said grating receiving light from corresponding microlens.

2. The wavefront sensor according to claim 1, wherein said gratings are reflective gratings which reflect light received from a corresponding microlens back to said array of microlenses said array of microlenses further including, on a side opposite to said microchip, focussing elements arranged in an array.

3. The wavefront sensor according to claim 2, wherein said focussing element directs light diffracted by said gratings onto a corresponding photodetector.

4. The wavefront sensor according to claim 1, wherein each photodetector receives light from gratings adjacent thereto on said microchip.

5. The wavefront sensor according to claim 1, wherein said photodetector outputs signals to a deformable mirror.

6. The wavefront sensor according to claim 1, wherein an amount of shearing introduced to beam interfering on the photodetectors is equal to a pitch of the microlens array.

7. The wavefront sensor according to claim 1, wherein said gratings are chirped gratings.

8. An adaptive optic system comprising:
   an array of reflective modulator elements;
   a microchip containing gratings and photodetectors arranged in an array; and
   an array of microlenses supported over said microchip, each microlens of said array corresponding to a grating on said microchip, said grating receiving light from corresponding microlens, said photodetectors receiving light diffracted from adjacent gratings, a modulator element being controlled in accordance with an output of a corresponding photodetector.

9. The adaptive optical system according to claim 8, wherein said gratings are reflective gratings which reflect light received from a corresponding microlens back to said array of microlenses further including, on a side facing said microchip, focussing elements arranged in an array.

10. The adaptive optical system according to claim 8, wherein a focussing element directs light diffracted by said gratings onto a corresponding photodetector.

11. The adaptive optical system according to claim 8, wherein each photodetector receives light from gratings adjacent thereto on said microchip.

12. The adaptive optical system according to claim 8, wherein said photodetectors, said gratings, and said modulator elements are integrated on a same side of said microchip.

13. The adaptive optical system according to claim 8, wherein said modulator elements are integrated on an opposite side of said microchip of said photodetectors and said gratings.

14. The adaptive optical system according to claim 13, further comprising another array of microlenses above said array of modulator elements.

15. The adaptive optical system according to claim 8, wherein an amount of shearing introduced to beam interfering on the photodetectors is equal to a pitch of the microlens array.

16. The adaptive optical system according to claim 8, wherein said gratings are chirped gratings.

17. A method for sensing a wavefront comprising the steps of:

arranging gratings and photodetectors in an array on a microchip;

supporting an array of microlenses over said microchip, each microlens of said array corresponding to a grating on said microchip, said grating receiving light from a corresponding microlens and diffracting received light into opposite orders; and directing light diffracted by two of said gratings onto a corresponding photodetector, in order to sense the wavefront.

18. The method according to claim 17, wherein said directing includes reflecting light received by said gratings from a corresponding microlens back to said array of microlenses, and focussing reflected light onto a corresponding photodetector.

19. The method according to claim 18, wherein said focussing includes focussing light diffracted from adjacent gratings onto a corresponding photodetector.

20. The method according to claim 17, wherein said directing step includes directing light from gratings adjacent to each photodetector onto that photodetector.

21. The method according to claim 17, further comprising outputting the sensed wavefront to a deformable mirror.

* * * * *